United States Patent [19]

Hemmann et al.

[11] Patent Number: 4,990,770

[45] Date of Patent: Feb. 5, 1991

[54] MEASURING ARRANGEMENT FOR TESTING A PLURALITY OF LIGHT WAVEGUIDES

[75] Inventors: Rainer Hemmann, Cologne; Volker Riech, Leverkusen, both of Fed. Rep. of Germany

[73] Assignee: U.S. Philips Corp., New York, N.Y.

[21] Appl. No.: 253,791

[22] Filed: Oct. 5, 1988

[30] Foreign Application Priority Data

Oct. 20, 1987 [DE] Fed. Rep. of Germany ....... 3735399

[51] Int. Cl.$^5$ ................................................. H01J 5/16
[52] U.S. Cl. ............................ 250/227.24; 250/227.26; 356/73.1
[58] Field of Search ............... 250/227, 227.24, 227.26; 356/73.1

[56] References Cited

U.S. PATENT DOCUMENTS

| | | | |
|---|---|---|---|
| 3,325,594 | 6/1967 | Goldhammer et al. | 356/73.1 |
| 4,624,562 | 11/1986 | Buck et al. | 356/73.1 |
| 4,634,274 | 1/1987 | Shen et al. | 356/73.1 |
| 4,639,130 | 1/1987 | Koike et al. | 356/73.1 |
| 4,676,635 | 6/1987 | Sakamoto et al. | 356/73.1 |

FOREIGN PATENT DOCUMENTS

| | | | |
|---|---|---|---|
| 0191947 | 11/1983 | Japan | 356/73.1 |
| 2064103 | 6/1981 | United Kingdom | 356/73.1 |

OTHER PUBLICATIONS

Anritsu Corporation, "Optical Chemical Selector", Jun. 1986, p. 1.

*Primary Examiner*—David C. Nelms
*Assistant Examiner*—Khaled Shami
*Attorney, Agent, or Firm*—Ernestine C. Bartlett

[57] ABSTRACT

A measuring arrangement for testing a plurality of light waveguides by an optical measuring device having an optical measuring input to which each light waveguide can be successively coupled via an optical selector is provided. The measuring device (4,5,6) and the selector (11) are integrated parts of a uniform testing device (1), so that the arrangement can be handled in a reliable and simple manner without imposing strict requirements on care of operation.

7 Claims, 1 Drawing Sheet

MEASURING ARRANGEMENT FOR TESTING A PLURALITY OF LIGHT WAVEGUIDES

FIELD OF THE INVENTION

The invention relates to a measuring arrangement for testing a plurality of light waveguides by means of an optical measuring device having an optical measuring input to which each light waveguide can be successively coupled via an optical selector.

BACKGROUND OF THE INVENTION

Such known arrangements are particularly required for testing the manufacturing quality of light waveguide cables. In the document CAT. No. MN 936/937-1 "Optical Channel Selector" of the firm of Anritsu Corporation Japan, June 1986 a selector for optical measuring devices is described to which six different light waveguides can be connected and which can optionally be coupled to an output connection which can be coupled to an optical measuring device for measurement of the attenuation or the transmission bandwidth.

For the purpose of coupling, detachable optical connection facilities must be provided which enable an accurate and reproducible geometric alignment of the end faces of the light waveguides to be tested. If a measuring arrangement of the type described in the opening paragraph is to be used for quality tests during the manufacture of optical cables, a multitude of repetitive coupling operations must be performed. The sensitive optical connection elements may then wear down prematurely or they may be damaged due to improper handling, which cannot be excluded, or contamination so that undefined increased insertion losses are the result. Repairs on highquality optical measuring devices are costly and time-consuming.

SUMMARY OF THE INVENTION

An object of the invention is to provide an arrangement for testing a plurality of light waveguides by means of an optical measuring device having an optical measuring input to which each light waveguide can be successively coupled via an optical selector which can be operated in a reliable and simple manner, even if less meticulous requirements are imposed on its operation.

This object of the invention is realized in that the measuring device and the selector are integrated parts of a uniform testing device.

The selector as a part of the testing device is protected so that only coupling points for the light waveguides to the exterior are accessible and subject to detrimental influences.

According to an advantageous embodiment of the invention, the optical inputs of the selector are connected to inner optical connection elements of a coupling element particularly constituting a part of the testing device, and the inner connection elements are coupled in an optically conducting manner to exterior connection elements adapted to be coupled to the light waveguides.

The coupling element whose exterior connection elements may be damaged can be exchanged separately. This can be done in a simple manner, even by an unskilled user. The parts which are subject to wear can be repaired, or their function can be tested without great difficulty.

In a preferred embodiment the light waveguides are positioned in a common connection block in such a way that their end faces are aligned in the grid of the exterior connection elements of the coupling element and that the connection block is connectable to the testing device in such a position that the light waveguides are optically connected to the exterior connection elements. The light waveguide ends projecting from a cable can then be positioned and fixed in a predetermined position at any place in the connection block. Connection to the measuring arrangement is then realized by means of a single and simple coupling process.

The light waveguides can be positioned in the connection block in a very easy way without having to ensure an extraordinary precision, if the end faces of the light waveguides are located opposite the end faces of the light-conducting elements of the exterior connection elements in the coupled state over a distance of approximately 100 to 800 $\mu$m. It is true that the distance between the end faces of the light-conducting elements to be coupled results in increased insertion losses, but these are substantially invariably constant, even at a relatively large central offset of the end faces. Consequently, the reproducibility of the coupling quality is excellent in spite of relatively high geometric tolerances. Intensity losses of the transmitted light are acceptable, provided that they remain proportionally constant, because available measuring devices are adequately sensitive. The described coupling, using a deliberately large distance between the light waveguide endfaces to be coupled, is particularly suitable for transmission measurements in which light transmitter and light receiver are arranged at opposite ends of a light waveguide to be measured.

However, when backscattering measurements (OTDR) are to be performed, it is preferred that the optical inputs of the selector are connected to light waveguide ends which are positioned in V grooves of a coupling block, and that the light waveguides to be measured are positioned opposite these ends in the V grooves of the coupling block and are movable in the direction of the end faces of the light waveguide ends by means of a clamping block holding the light waveguides. In the backscattering method a possibly minimal insertion attenuation is important, rather than the reproducibility of the light transmission by means of the coupling points.

The versatility of the measuring arrangement according to the invention is enhanced in that the testing device comprises a plurality of different measuring devices whose optical inputs are adapted to be coupled optionally to each of the light waveguides.

If a plurality of measuring devices is coupled to different light waveguides in a given position of the selector, different measuring processes can be performed simultaneously on different light waveguides.

BRIEF DESCRIPTION OF THE DRAWINGS

The invention will now be described in greater detail, by way of example, with reference to the accompanying drawing in which.

DETAILED DESCRIPTION OF PREFERRED EMBODIMENTS

Figure 1:
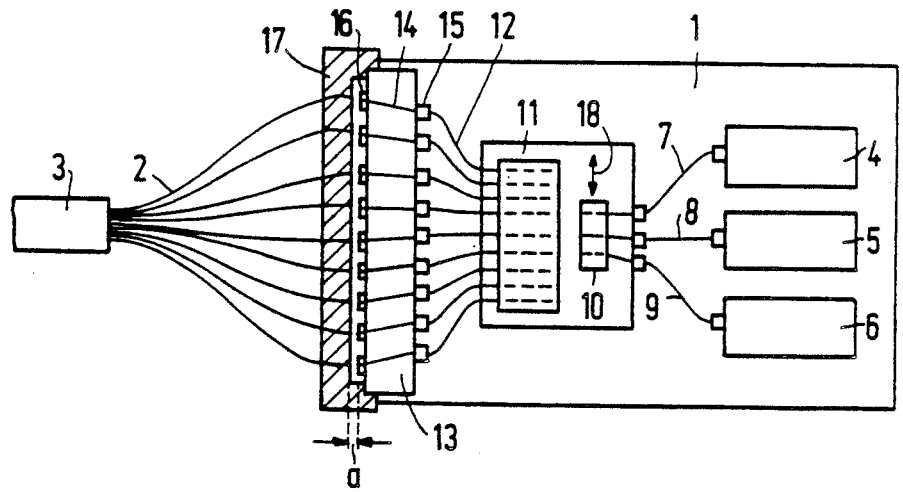
FIG. 1 shows diagrammatically the components which are essential for the features of a measuring arrangement according to the invention.

FIG. 1 shows diagrammatically a measuring arrangement 1 with which quality tests are to be performed on none light waveguides 2 of an optical cable 3. For example, the attenuation at a first light wavelength is measured with the aid of measuring device 4, the attenuation at a second light wavelength is measured with the aid of a measuring device 5 and the transmission bandwidth is measured with the aid of a measuring device 6.

The optical inputs 7, 8 and 9 of these measuring devices are connected in a light-conducting manner to a movable carriage 10 of a selector 11. This carriage can be moved in very accurate steps in the direction of the double arrow 18 so that each of the inputs 7, 8 or 9 can be connected in an optically conducting manner to each of the nine connection leads 12 of the selector 11.

The light waveguides 2 are not directly connected to the corresponding connection lead 12 of the selector 11, but via an intermediate coupling element 13 associated with the testing device 1 in which element nine intermediate leads 14 are connected in a fixed or detachable way to one connection lead 12 each, for example by means of a conventional plug connection 15. The end faces of the intermediate leads 14 terminate in connection fittings 16, preferably in a common plane.

The ends of the light waveguides 2 of the optical cable 3 are inserted and fixed in a connection block 17 in such a way that their end faces are located concentrically opposite an associated end face of an intermediate lead 14 at possibly equal distances.

The connection block 17 abuts the testing device 1 in such a way that a distance a between the end faces of the light waveguides 2 and the intermediate leads 14 is created.

In case of damage or contamination of the end faces or connection fittings 16 the entire coupling element 13 can be easily exchanged. The optical connection of the selector 11 within the testing device 1 are protected and secured against damage.

For the sake of simplicity, FIG. 1 shows a selector with a linearly movable scanner carriage 10. However, a rotational selector version would also be favorable (compare No. DE-OS 39 905 which corresponds substantially to Great Britain Patent application No. GB-A-2,064,103) in which the optical leads to be scanned are equidistantly arranged on a circle or on coaxial circles.

Figure 2:
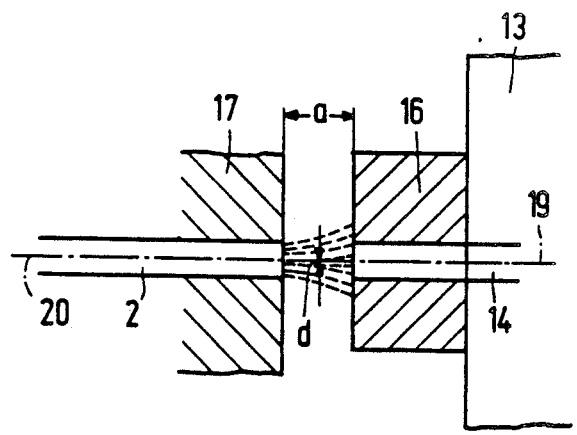
FIG. 2 shows on an enlarged scale the relative position of a light waveguide to be coupled with respect to an optical input lead of the measuring arrangement.

FIG. 2 shows the spatial arrangement of the end faces of a light waveguide 2 and an associated intermediate lead 14 in the coupling position on an enlarged scale. The optical beam emerges in a widening form from the light waveguide in accordance with the broken lines and only a part of its light output reaches the intermediate lead 14. However, this light output does not substantially change when the optical axes 20 and 19 of the light waveguide 2 or the intermediate lead 14 are offset over a distance d. Moreover, a relatively large angular offset of the axes 20 and 19 is permitted. The larger the distance a, the less sensitively the measuring arrangement 1 reacts to alignment errors of the light waveguides 2. However, the distance a should not be chosen to be too large, so that unnecessarily high coupling losses are prevented. Values of a in the range between 100 and 800 $\mu$m have been found advantageous.

In the embodiment of the measuring arrangement shown in FIG. 1 as a so-called cable measuring automat, elements such as electronic components and output or indicator units are of course required. They may be constructed in a way known to those skilled in the art. The drawing does not show them for the sake of clarity of the features essential to the invention.

Figure 3:
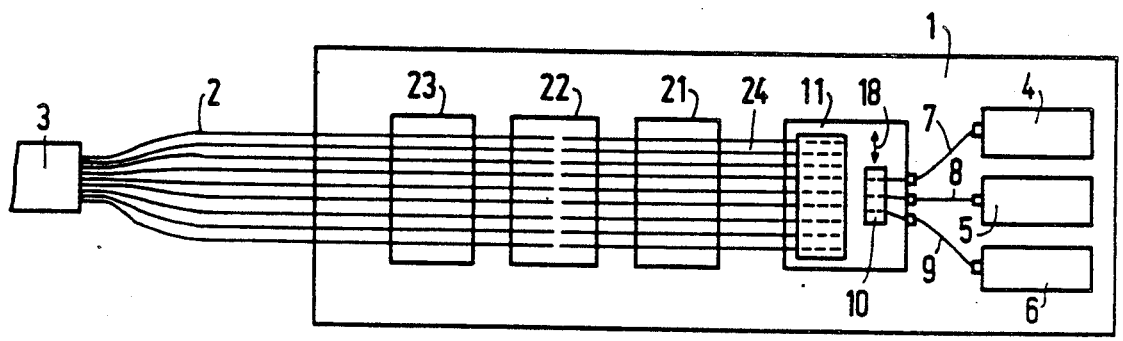
FIG. 3 shows diagrammatically a modification of a measuring arrangement.

In the modification illustrated the measuring arrangement of FIG. 3, which is preferred for backscattering measurements, components which are identical to those of the arrangement shown in FIG. 1 have the same reference numerals. The light waveguide ends 24 leading to the selector 11 are fixed in a clamping block 21 and terminate in continuous guide grooves, for example having a triangular cross-section or V grooves, of the coupling block 22. One of the light waveguide ends 24 faces one of the light waveguides 2 in each V groove. The group of light waveguides 2 is fixed in the clamping block 23. The end faces of the light waveguides 2 are subsequently pressed against the end faces of the light waveguide ends 24 by moving the clamping block 23. Details of a coupling device suitable for this purpose are described in, for example, No. DE-A 36 13 345 which corresponds substantially to U.S. Pat. No. 4,807,960.

What is claimed is:

1. A measuring arrangement for testing a plurality of light waveguides by means of an optical measuring device having an optical measuring input to which each light waveguide can be successively coupled via an optical selector, wherein the measuring device (4, 5, 6) and the selector (11) are integrated parts of a uniform testing device (1), the selector and the measuring device being interiorly located in said device (1) so that only coupling points for the light waveguides to exterior connection elements are accessible outside the testing device.

2. A measuring arrangement for testing a plurality of light waveguides by means of an optical measuring device having an optical measuring input to which each light waveguide can be successively coupled via an optical selector, wherein the measuring device (4, 5, 6) and the selector (11) are integrated parts of a uniform testing device (1) and wherein the optical inputs (12) of the selector (11) are connected to inner optical connection elements (15) of a coupling element (13) constituting a part of the testing device (1), the inner connection elements (15) being connected in an optically conducting manner to exterior connection elements (16) adapted to be coupled to the light waveguides (2).

3. A measuring arrangement for testing a plurality of light waveguides by means of an optical measuring device having an optical measuring input to which each light waveguide can be successively coupled via an optical selector, wherein the measuring device (4, 5, 6) and the selector (11) are integrated parts of a uniform testing device (1) and wherein the light waveguides (2) are positioned in a common connection block (17) so that their end faces are aligned in a grid of exterior connection elements (16) of a coupling element (13) and the connection block (17) is connectable to the testing device (1) in such a position that the light waveguides (2) are optically connected to the exterior connection elements (16).

4. A measuring arrangement as claimed in claim 3, wherein end faces of the light waveguides (2) are located opposite end faces of light-conducting elements (14) of the exterior connection elements (16) in the coupled state over a distance of approximately 100 to 800 $\mu$m.

5. A measuring arrangement for testing a plurality of light waveguides by means of an optical measuring device having an optical measuring input to which each light waveguide can be successively coupled via an optical selector, where the measuring device (4, 5, 6) and the selector (11) are integrated parts of a uniform testing device (1) and wherein the optical inputs of the selector (11) are connected to light waveguide ends (24) which are positioned in grooves of a coupling block (22), and the light waveguides (2) to be measured are positioned opposite these ends in V grooves of a coupling block (21) and are movable in the direction of end faces of the light waveguide ends (24) by means of a clamping block (23) holding the light waveguides (2).

6. A measuring arrangement as claimed in claims 2, 3, 4 or 5 wherein the testing device (1) comprises a plurality of different measuring devices (4, 5, 6) having optical inputs (7, 8, 9) which can be optionally coupled to each of the light waveguides (2).

7. A measuring arrangement as claimed in claim 6 wherein a plurality of measuring devices is coupled to different light waveguides in a given position of the selector whereby different measuring processes can be performed simultaneously on different light waveguides.

* * * * *